United States Patent
Zimdars

(10) Patent No.: US 10,024,963 B2
(45) Date of Patent: Jul. 17, 2018

(54) SYSTEM AND METHOD TO DETECT ANOMALIES

(71) Applicant: Picometrix LLC, Ann Arbor, MI (US)

(72) Inventor: David Zimdars, Ann Arbor, MI (US)

(73) Assignee: PICOMETRIX LLC, Ann Arbor, MI (US)

( * ) Notice: Subject to any disclaimer, the term of this patent is extended or adjusted under 35 U.S.C. 154(b) by 516 days.

(21) Appl. No.: 14/386,572

(22) PCT Filed: Mar. 25, 2013

(86) PCT No.: PCT/US2013/033650
§ 371 (c)(1),
(2) Date: Sep. 19, 2014

(87) PCT Pub. No.: WO2013/142853
PCT Pub. Date: Sep. 26, 2013

(65) Prior Publication Data
US 2015/0060673 A1    Mar. 5, 2015

Related U.S. Application Data

(60) Provisional application No. 61/614,903, filed on Mar. 23, 2012.

(51) Int. Cl.
*G01S 17/02* (2006.01)
*G01S 17/88* (2006.01)
(Continued)

(52) U.S. Cl.
CPC ........... *G01S 17/026* (2013.01); *G01S 7/412* (2013.01); *G01S 7/4802* (2013.01);
(Continued)

(58) Field of Classification Search
CPC .................... G01V 5/0016; G01S 13/887
See application file for complete search history.

(56) References Cited

U.S. PATENT DOCUMENTS

| | | | |
|---|---|---|---|
| 5,081,456 A | 1/1992 | Michiguchi et al. | |
| 5,181,234 A | 1/1993 | Smith | |

(Continued)

FOREIGN PATENT DOCUMENTS

| | | |
|---|---|---|
| JP | S63255683 A | 10/1988 |
| JP | H1183996 A | 3/1999 |

(Continued)

OTHER PUBLICATIONS

Moeller, Lothar, "Standoff Detection of Concealed Weapons using a Terahertz Illuminator with an Uncooled Imager," NIJ Award: 2007-RG-CX-K013; Research Report; Aug. 2011.*

(Continued)

*Primary Examiner* — Yara B Green
(74) *Attorney, Agent, or Firm* — Brinks Gilson & Lione

(57) ABSTRACT

A system and method for detecting anomalies concealed upon a person may include a detection probe having an electromagnetic transmitter and an electromagnetic receiver. The electromagnetic transmitter is configured to emit electromagnetic pulses, while the electromagnetic receiver is configured to sample electromagnetic pulses from the electromagnetic receiver at specified times within a waveform window. The electromagnetic pulses may span the terahertz spectral region of 0.04 to 4 THz. The system may also have optical fibers connected to the electromagnetic transmitter and electromagnetic receiver, wherein femtosecond laser pulses are directed from a source to the electromagnetic transmitter and the electromagnetic receiver by the optical fibers.

22 Claims, 6 Drawing Sheets

(51) Int. Cl.
    *G01S 13/02*     (2006.01)
    *G01S 13/88*     (2006.01)
    *G01S 7/41*     (2006.01)
    *G01S 7/48*     (2006.01)
    *G01V 5/00*     (2006.01)
    *G01S 17/00*     (2006.01)
    *G01S 17/10*     (2006.01)
    *G01S 13/00*     (2006.01)
    *G01S 13/10*     (2006.01)

(52) U.S. Cl.
    CPC ........ *G01S 13/0209* (2013.01); *G01S 13/887* (2013.01); *G01S 17/88* (2013.01); *G01V 5/0016* (2013.01); *G01S 13/003* (2013.01); *G01S 13/10* (2013.01); *G01S 17/003* (2013.01); *G01S 17/10* (2013.01)

(56) References Cited

U.S. PATENT DOCUMENTS

| | | | |
|---|---|---|---|
| 6,034,642 A * | 3/2000 | Kojima | G01S 13/931 343/753 |
| 6,359,582 B1 | 3/2002 | MacAleese et al. | |
| 2002/0175849 A1 | 11/2002 | Arndt et al. | |
| 2006/0169029 A1 | 8/2006 | Heyman | |
| 2007/0114418 A1* | 5/2007 | Mueller | G01J 3/42 250/341.1 |
| 2007/0235658 A1* | 10/2007 | Zimdars | G01J 3/42 250/390.07 |
| 2011/0253896 A1* | 10/2011 | Brown | F41G 1/35 250/349 |
| 2012/0008140 A1* | 1/2012 | Khan | G01N 21/3581 356/326 |

FOREIGN PATENT DOCUMENTS

| | | | |
|---|---|---|---|
| JP | 2002514298 A | | 5/2002 |
| JP | 2006508333 A | | 3/2006 |
| JP | 2008500541 A | | 1/2008 |
| JP | 2008151618 A | | 7/2008 |
| WO | PCT/IL2007/000736 | * | 12/2007 |

OTHER PUBLICATIONS

Extended European Search Report dated Sep. 23, 2015.
International Search Report and Written Opinion dated Jun. 10, 2013.
Japanese Office Action with translation dated Nov. 8, 2016.

* cited by examiner

SYSTEM AND METHOD TO DETECT ANOMALIES

CROSS REFERENCE TO RELATED APPLICATIONS

This application is a nationalization of PCT Serial No. PCT/US2013/033650, filed Mar. 25, 2013 which claims benefit of U.S. Provisional Application Ser. No. 61/614,903, filed Mar. 23, 2012.

BACKGROUND

1. Field of the Invention

The system and method relates to anomaly detection for detecting anomalous objects on the body of a person.

2. Description of the Known Art

Computerized tomography ("CT") imaging has been employed for non-destructive examination of various types of articles, such as contraband, which may be hidden inside luggage. However, CT systems emit X-rays, which may pose a health risk to the operators of such systems, as well as passengers who may be standing near the system, and hence CT systems generally include some type of shield to protect the operators and passengers ionizing radiation. Moreover, although CT systems are capable of analyzing the density of an article, along with other characteristics of the shape and volume of the article, these systems do not have spectroscopic capabilities, and therefore cannot analyze the chemical compositions of the articles. Furthermore, X-rays are not sensitive to the optical traits that result from the article's refractive index and absorption coefficient. These properties, if measurable, can yield unique, high-contrast images and reveal much about the reflective, absorptive and scattering properties of material.

BRIEF SUMMARY

The system and method to detect anomalies is intended to detect anomalous objects on the body of a person without the need for imaging, and the associated privacy concerns. The primary target area for inspection is the head covered by headwear that was not removed prior to security screening. In addition it is expected that this system could also be used to inspect sensitive areas, such as the chest, groin and buttocks.

The system is a device that is capable of detecting an anomaly on the body of a person during security screening. An anomaly is defined as any object on any part of the body that is not a natural occurring part of the body and has not been removed during the screening process. The term anomaly is meant to separate the concept of identifying a specific threat (e.g. explosive, gun, etc.) from simply detecting a foreign object on the body that could be a threat.

This system and method provides for interrogating a point location on the human body and detecting objects under the clothes without the need for imaging. This system and method described includes a hand held portion which will be used to interrogate the suspect location.

There are up to four primary guidelines that have governed the system and method of operation: (1) the system and method are designed to detect anomalies on the body underneath clothing, specifically in the head-region and sensitive areas of the body (groin, buttocks, and breast areas) without violating privacy and religious concerns, (2) the system and method are intended to allow operation by a single screening officer to provide targeted screening of a passenger; (3) the system and method have a small footprint, and is small enough to be portable for screening in areas other than the checkpoint; and (4) the system and method detect a "signature" of the anomaly, which means that the detection occurs without an image or image interpretation.

While it is expected that the system will be deployed at a security checkpoint, the size of the unit and the flexibility of the umbilical connection of the handheld unit will make it compatible with a number of deployment scenarios, such as spot checks at gates, or integration with existing portals. For example, the unit could be deployed on top of an existing portal with the handheld unit available to conduct secondary screening.

The application for the system and method is the examination of clothing and in particular, religious headwear in a security checkpoint environment. The unit is portable, and designed to be used by a single operator. The examination is conducted in order to locate sub-surface objects that may constitute a threat as defined later.

There are up to three primary functional requirements that compose the system and method capability: (1) detect anomalies in the head-region possibly concealed by clothing on or off the body; and in particular religious headwear, wigs, hats, caps or scarves—other uses would be to detect anomalies in casts and prosthesis; (2) allow a single screening officer to provide targeted screening of a passenger with minimal equipment footprint, minimal staffing, ease-of-use, and potential portability for screening in areas other than the checkpoint; and (3) perform detection while not tied to an image or image interpretation.

If a wearer of clothing (such as religious headwear) is designated for inspection, they will be taken aside and examined using the system and method. While this system and method are designed for use in a public checkpoint environment, it is also suitable for any location where standard power is available. The system does not require a fixed installation. It can be relocated to wherever needed.

The system for detecting anomalies concealed upon a person may include a detection probe having an electromagnetic transmitter and an electromagnetic receiver. The electromagnetic transmitter is configured to emit electromagnetic pulses, while the electromagnetic receiver is configured to sample electromagnetic pulses from the electromagnetic receiver at specified times within a waveform window. The electromagnetic pulses may span the terahertz spectral region of 0.04 to 4 THz. The system may also have optical fibers connected to the electromagnetic transmitter and electromagnetic receiver, wherein femtosecond laser pulses are directed from a source to the electromagnetic transmitter and the electromagnetic receiver by the optical fibers.

The system may also include an objective optic incorporated in the detection probe for directing the pulsed electromagnetic radiation through a concealment stack and collecting reflections of the concealment stack at a defined distance. The detection probe may be focused at the depth of concealed skin of the person without the exterior of the detection probe contacting a top of the concealment stack. The transmitter and receiver may then be configured in a monostatic reflection geometry with respect to an objective optic.

The system may also include a time domain data acquisition system in communication with the receiver. The time domain data acquisition system configured to capture reflections from a range thickness of the concealment stack, the waveform window having the reflection time corresponding to the focus of the objective lens.

The concealment stack over the skin of the person may include clothing or coverings sufficiently small thickness, density or mass, wherein time domain data acquisition system determines the concealment stack to not contain an anomaly or a shield. The clothing or coverings may include natural or synthetic cloth, leather, rubber, vinyl, paper, plastic and/or other thin fibers, sheets or weaves.

The concealment stack further have one or more intereferent components located at any position within the concealment stack and composed of material of the same type as an anomaly or shield. The time domain data acquisition system is then configured to determine that the intereferent is smaller in volume, density, or mass than a threshold value to be considered an anomaly. The concealment stack further include one or more anomaly placed at any level within the concealment stack, where the anomaly is an object of greater thickness, lateral extent, volume, density, or mass than a threshold value.

The time domain data acquisition system may be configured to choose a quantitative threshold for thickness, lateral extent; volume, density, or mass to be considered an anomaly by scaling thresholds to electromagnetic properties of the anomaly material in comparison to a benign material in the concealment stack and evaluating the measurement from the system as an anomaly when the waveform contains one or more features indicating that an object within the concealment stack exceeds the scaled thresholds.

The system may also include a light source that projects an illuminated pattern onto the concealment stack on the person under test indicating a region of inspection.

The system may also have a compensator located between the source and the electromagnetic transmitter or electromagnetic receiver, wherein the compensator compensates the pulses so that the pulses are sufficiently short at the electromagnetic transmitter or electromagnetic receiver. The compensator may be a grating sequence, a prism sequence, a grism sequence, a fiber bragg grating, or anomalous dispersion fiber.

The system may also have a sensor connected to the detection probe, wherein the sensor is configured to provide coordinates of the detection probe's position in one or more dimensions of space or angle. Additionally or alternatively, the sensor may be configured to detect in a different modality than the waveforms reflected from the concealment stack and interrogate a substantially same region of concealment stack on the person.

The system may also include a secondary transmitter connected to the detection, wherein the secondary transmitter if configured to emit alpha, beta, x-ray, or gamma rays.

The method for evaluating a time domain reflected waveform for criteria corresponding to features which indicate an anomaly in a region of a concealment stack on a person, may include the steps of: illuminating a concealment stack with an electromagnetic pulse directed from a transmitter located in a dynamically positioned probe; collecting the waveform by a receiver in the probe; parsing the waveform into a candidate group of positive or negative going peaks corresponding to reflection interfaces within the concealment stack; and determining if an anomaly is present if one or more peaks within the candidate group quantitatively correspond to one or more thresholds computed from the amplitudes and/or one or more differences in time between one or more peaks in the candidate group.

The method may include the step of deconvolving the waveform with a pre-recorded reference reflection waveform. The pre-recorded reference reflection waveform may be a single reflection from an air-metal interface.

The method may include the step of scaling the amplitude of the peaks as a function of a relative increase of the peaks in time with respect to a first peak in the waveform for compensating for a loss from intervening concealment as the thickness of the concealment stack increases. The method may include the step of scaling the amplitude of the peaks as a function of a relative number after a first peak in the waveform for compensating for a loss from intervening concealment as the thickness of the concealment stack increases.

The method may include the step of not evaluating a waveform if any peak in the waveform falls outside a window of minimum or maximum time for reducing a false alarm rate.

The method may include the steps of ordering the peaks in the candidate group from lesser to greater time and determining if a difference in time between a first and a second peak exceeds a minimum threshold.

The method may include the step of determining the presence of an anomaly if a positive going peak in the candidate group exceeds a threshold corresponding to a maximum expected reflection amplitude from a benign concealment, wherein additional peaks must be present after the positive going peak.

DETAILED DESCRIPTION

Figure 1:
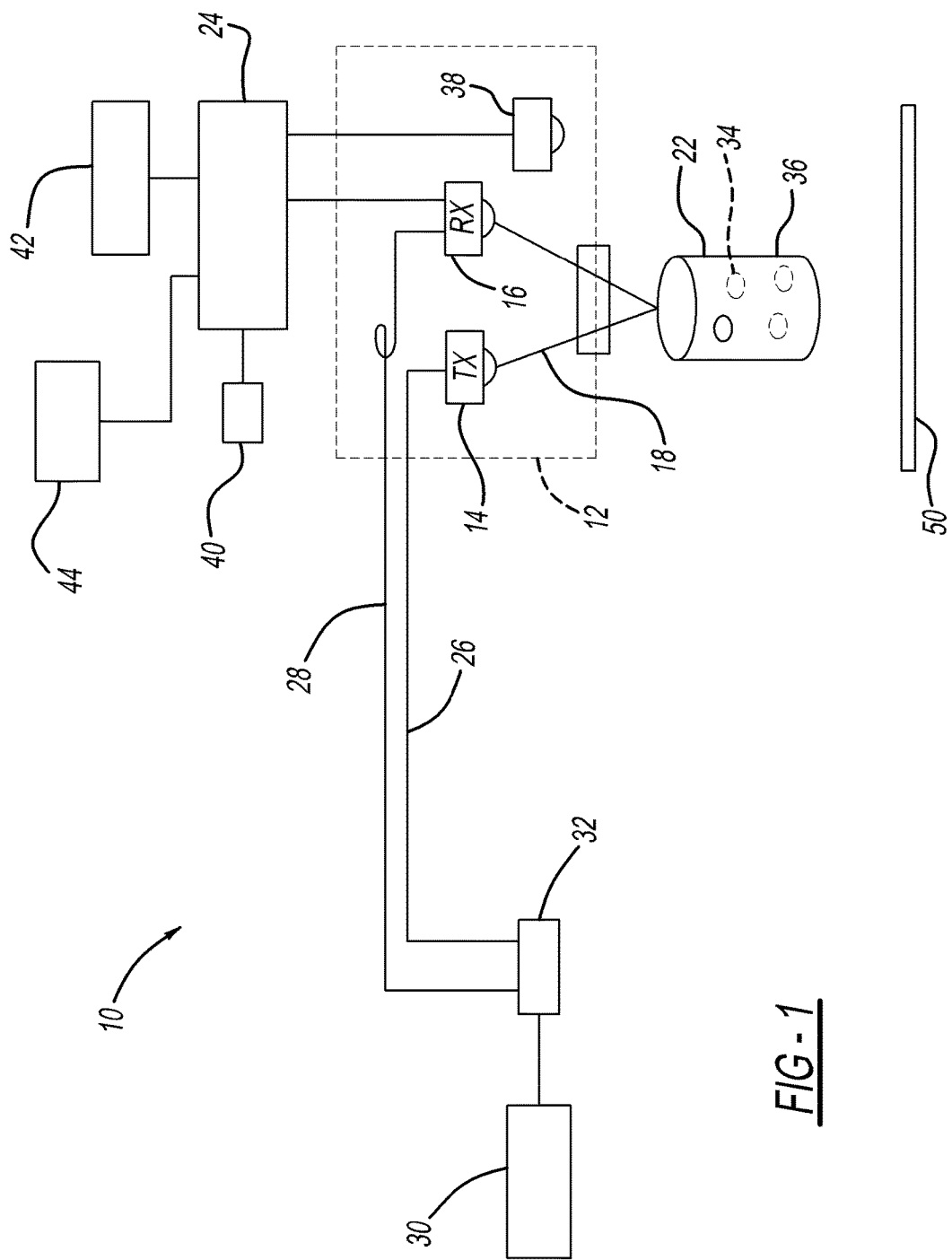
FIG. 1 illustrates a block diagram of a system for detecting anomalous objects on the body of a person.

Referring to FIG. 1, the system 10 includes a detection probe 12 having an electromagnetic transmitter 14 and an electromagnetic receiver 16. The electromagnetic transmitter 14 is configured to emit electromagnetic pulses 18, while the electromagnetic receiver 16 is configured to sample electromagnetic pulses 18 from the electromagnetic receiver 14 at specified times within a waveform window. The electromagnetic pulses 18 may span the terahertz spectral region of 0.04 to 4 THz.

The system further includes an objective optic 20 incorporated in the detection probe 12 for directing the pulsed electromagnetic radiation 18 through a concealment stack 22 and collecting reflections 18 of the concealment stack 22 at a defined distance, wherein the detection probe 12 may be focused at the depth of concealed skin of the person without the exterior of the detection probe 12 contacting a top of the concealment stack 22. The transmitter 14 and receiver 16 may be configured in a monostatic reflection geometry with respect to an objective optic 20.

The system 10 further includes a time domain data acquisition system 24 in communication with the receiver 14 and transmitter 16. The time domain data acquisition system 24 configured to capture reflections from a range thickness of the concealment stack 22, the waveform window having the reflection time corresponding to the focus of the objective lens 20.

The system 10 may also have optical fibers 26 and 28 connected to the electromagnetic transmitter and electromagnetic receiver, respectively, wherein femtosecond laser pulses are directed from a source 30 to the electromagnetic transmitter 14 and the electromagnetic receiver 16 by the optical fibers 26 and 28, respectively. The system 10 may also have a compensator 32 located between the source 30 and the electromagnetic transmitter 14 or electromagnetic receiver 16, wherein the compensator 32 compensates the pulses so that the pulses are sufficiently short at the electromagnetic transmitter or electromagnetic receiver. The compensator 32 may be a grating sequence, a prism sequence, a grism sequence, a fiber bragg grating, or anomalous dispersion fiber.

The concealment stack 22 over the skin of the person may include clothing or coverings sufficiently small thickness, density or mass, wherein time domain data acquisition system determines the concealment stack to not contain an anomaly 34 or a shield 36. The clothing or coverings may include natural or synthetic cloth, leather, rubber, vinyl, paper, plastic and/or other thin fibers, sheets or weaves.

The concealment stack 22 further have one or more intereferent components 34 and 36 located at any position within the concealment stack 22 and composed of material of the same type as an anomaly 34 or shield 36. The time domain data acquisition system 24 is then configured to determine that the intereferent is smaller in volume, density, or mass than a threshold value to be considered an anomaly. The concealment stack 22 may further include one or more anomaly placed at any level within the concealment stack, where the anomaly is an object of greater thickness, lateral extent, volume, density, or mass than a threshold value.

The time domain data acquisition 24 system may be configured to choose a quantitative threshold for thickness, lateral extent; volume, density, or mass to be considered an anomaly by scaling thresholds to electromagnetic properties of the anomaly material in comparison to a benign material in the concealment stack 22 and evaluating the measurement from the system 10 as an anomaly when the waveform contains one or more features indicating that an object within the concealment stack 22 exceeds the scaled thresholds.

The system 10 may also include a light source 38 that projects an illuminated pattern onto the concealment stack on the person under test indicating a region of inspection.

The system may also have a sensor 40 connected to the detection probe 12, wherein the sensor 40 is configured to provide coordinates of the detection probe's position in one or more dimensions of space or angle. Additionally or alternatively, the sensor 40 may be configured to detect in a different modality than the waveforms reflected from the concealment stack 22 and interrogate a substantially same region of concealment stack on the person.

The system may also include a secondary transmitter 42 connected to the detection, wherein the secondary transmitter 42 is configured to emit alpha, beta, x-ray, or gamma rays.

The method, which may be executed by the data acquisition system 24 or a separate computer 44 in communication with the data acquisition system 24, evaluates a time domain reflected waveform for criteria corresponding to features which indicate an anomaly in a region of a concealment stack 22 on a person, may include the steps of: illuminating a concealment stack with an electromagnetic pulse directed from a transmitter located in a dynamically positioned probe; collecting the waveform by a receiver in the probe; parsing the waveform into a candidate group of positive or negative going peaks corresponding to reflection interfaces within the concealment stack; and determining if an anomaly is present if one or more peaks within the candidate group quantitatively correspond to one or more thresholds computed from the amplitudes and/or one or more differences in time between one or more peaks in the candidate group.

The method may include the step of deconvolving the waveform with a pre-recorded reference reflection waveform. The pre-recorded reference reflection waveform may be a single reflection from an air-metal interface.

The method may include the step of scaling the amplitude of the peaks as a function of a relative increase of the peaks in time with respect to a first peak in the waveform for compensating for a loss from intervening concealment as the thickness of the concealment stack increases. The method may include the step of scaling the amplitude of the peaks as a function of a relative number after a first peak in the waveform for compensating for a loss from intervening concealment as the thickness of the concealment stack 22 increases. The method may include the step of not evaluating a waveform if any peak in the waveform falls outside a window of minimum or maximum time for reducing a false alarm rate.

The method may include the steps of ordering the peaks in the candidate group from lesser to greater time and determining if a difference in time between a first and a second peak exceeds a minimum threshold.

The method may include the step of determining the presence of an anomaly if a positive going peak in the candidate group exceeds a threshold corresponding to a maximum expected reflection amplitude from a benign concealment, wherein additional peaks must be present after the positive going peak.

Figure 2:
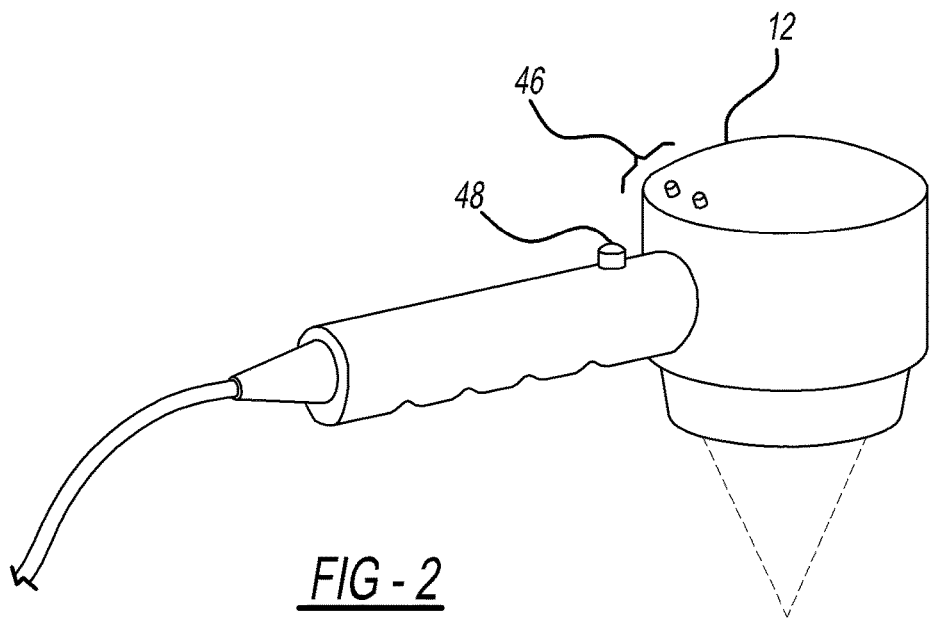
FIG. 2 illustrates a view of a detection probe of the system for detecting anomalous objects on the body of a person.

Referring to FIG. 2, the detection probe 12 is shown in a finalized form. The TD-THz anomaly detection system may be implemented using fiber-optic coupled TD-THz transmitter and receiver modules as shown in the figure below.

The detection probe 12 is configured with near F/1 focusing optics with focal length approximately 3 in. The TD-THz is an active, not a passive method. A monostatic configuration transmits and detects the reflected THz pulse on the same path so there is no parallax error. Focusing optics with f number ratios closer to 1 collect the largest signal and maximize the angular tolerance. The focal length should be chosen such that the working distance between the lens aperture and the subject's skin beneath the clothing is between 1 and 1.3 times the focal length. The operator positions the detection probe 12 so that the aperture is at the correct working distance and so that the emitted THz beam is approximately normal to the concealment surface and the subject's skin. The probe should not contact the concealment.

The detection probe 12 provide visual indication 46, indicating one or more of the following: 1) for the power status, 2) when the system is ready to scan a passenger, 3) when the operator is the appropriate distance from the head to obtain a valid measurement, and 4) unambiguous visual and audio alarm when the system has discovered an anomaly on the body.

Figure 3:
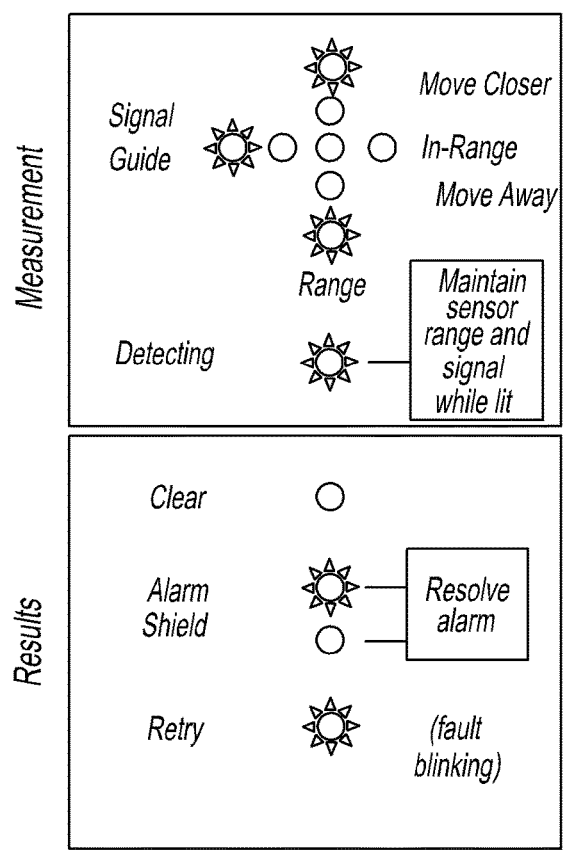
FIG. 3 illustrates controls and indicators that may be located on the detection probe.

The detection probe 12 includes controls and indicators (see FIG. 3 table below) and is connected by a light-weight umbilical to a portable control unit. The layout of the controls and indicators is for illustration purposes only, and may differ in the final design (for example, the indicators may be implemented by use of LED's, passive targeting guides, or an LCD screen). The purpose of these indicators is to guide the operator to perform a valid measurement, and to convey the results of the examination. The exact method of using the controls on a production device may also change slightly from the description below: The operator positions the hand-held device pointed at the location to be tested on the subject. The handheld device is to be located approximately 100 millimeters (mm) from the skin of the subject. The operator presses the trigger to start the device, at which time the range, angle, and signal guide indicators light. The detection device uses a pulse of terahertz light to probe the location for the signatures of concealed anomalies. The operator uses the guides and indicator cues to adjust the position of the device with respect to the subject. While a measurement is being made, the "detecting" indicator flashes. When the measurement has been made, an audible beep is heard and the device displays the result of the measurement.

| Hand-held indicators | Color | Notes |
| --- | --- | --- |
| Position indicator - move closer | yellow | guides operator to in-range |
| Position indicator - in-range | green | in-range |
| Position indicator - move farther | yellow | guides operator to in-range |
| Signal quality bar | increasing length or brightness | used to optimize signal |
| Measurement complete | audible beep | |
| Alarm | red with audible alarm | anomaly detected |
| Clear | green | no anomaly detected |

The detection probe 12 may also perform self-diagnostics on a continuous basis and inform the operator if there is any condition that would require service or repair.

The optical system 20 of the detection probe 12 is optimized for examining a position approximately 100 mm from the face of the hand-held unit. As a result the measurement will be optimized when this location is within 25 mm of the scalp of the person being examined. The region of measurement is approximately 100 mm. This positioning will allow the most accurate measurement. The recommended maximum thickness of headwear is 75-90 mm.

When starting the system 10, the method describes in this application the system 10 is powered on and in stand-by mode. The system 10 may include a computer 44 having a display and menu controls. When the system 10 is in standby mode, the operator may press button 48 on detection probe 12 to wake unit from standby mode. The detection probe 12 could be stored between use in a desktop holster which has reflection plate at fixed distance to create reference waveform.

When system 10 is ready and hand-held in holster, a reference waveform is collected from metal plate 50 at fixed distance and fixed orientation, representing pulse amplitude and pulse shape. This reference waveform will be used for waveform pulse parsing. The system 10 may first collect a background waveform for background subtraction by first turning off the transmitter 14. The reference waveform is examined to within range tolerance proper amplitude, timing, and bandwidth. If not, audible indicator and error messages on display. Audible indicator and display(s) indicate hand-held ready for use and instructs operator to remove hand-held from display. If detection probe 12 is not removed within a predetermined period, the system goes to sleep after a warning on the display(s).

When detection probe 12 is removed from display, the displays(s) inform the operator to press the trigger to examine a point on the subject. The choice of the language, audible indicators, and graphics describing the examination process communicated by the system to the operator will be very important to guide the operator through the steps in the examination process; to guide the operator in the best way to operate the hand-held to get the best results; and to "frame" the expected results when using the instrument.

The operator must choose one or more points to examine on the subject. The choice and number of these points will be important to the success of the instrument (cumulative POD, PFA). The choice of the language, audible indicators, and graphics describing the examination process communicated by the system to the operator will be very important to guide the operator through the steps in the examination process; to guide the operator in the best way to operate the hand-held to get the best results; and to "frame" the expected results when using the instrument.

The operator positions the detection probe 12 sensor over the subject target point and presses the trigger. A visible illuminated guide 38 projected on the target may aide the positioning of the sensor.

The THz waveform sequence is collected and evaluated continuously or the time out timer times out. Further, the system 10 may provide the operator with a series of warnings or guides, such as Operator is guided to optimize timing, Operator is guided to optimize signal level, Operator is provided warning when no signal, Operator is provided warning when wand too close or too distant, Operator is provided warning when only single surface reflection, Result latches alarm if metal anomaly detected, Result latches alarm if dielectric anomaly detected, Result latches clear if clear signature.

The automated TD-THz reflection anomaly signature detection method is based on the time-domain evaluation of reflected pulsed waveforms from the benign concealment and any anomalies (if present). The method is not primarily based on the frequency domain analysis of the spectroscopic signatures of explosives (although such analyses may be added to augment the device described herein). While many explosives have distinguishable transmission spectra which can be obtained in laboratory conditions, the real world circumstances of personnel screening will not reliably allow these spectra to be used as a primary discriminant. The time domain method is more like non-contact electromagnetic analog of pulse ultrasound, which allows the layer structure of the concealment and anomaly to be determined. Unlike ultrasound, this layer structure can be evaluated by thickness and index of refraction (dielectric constant) by examining the sequence and relative timing of the THz pulses reflected from the region under test. The method is signature based and automated, that is unlike millimeter wave whole body imagers, no meaningful image of the subject is (or can be) generated.

The subject under test consists of A) the elements consisting of the person, clothing, headgear, and ordinary personal effects which we will call the "benign concealment" and B) anomalies which are either threat objects (such as explosives and metallic and non-metallic weapons) or contraband or illicit substances such as drugs. A goal for an anomaly screening device is to allow the subject to be screened without the need to remove clothing or headgear, and to not require the security officer to touch the subject. An anomaly signature detector should provide an alarm to a security officer screening a subject with the device when an anomaly is present and should provide a clear signal when no anomaly is present. If an alarm is given, the subject would then be required to undergo additional inspection, such as removal of clothing items and manual inspection. As a practical matter, a third condition may occur known as C) a shield, where the instrument detects its own inability to make a measurement due to interference. Shields require an alarm because the subject must be screened by other means.

The THz transmitter 14 emits a near single cycle electromagnetic impulse with duration between 0.5 and 2 picoseconds (ps). The Fourier transform of this impulse reflecting from metal would yield frequency components from 0.05 THz to >2 THz, peaked at approximately 0.25 to 0.5 THz. The TD-THz method records a time-domain waveform record of fixed duration. The primary analysis of the THz waveforms is done in the time domain, not the frequency domain.

The THz pulse travels from the aperture and intersects the first surface of the concealment, penetrating each THz transparent dielectric layer and objects within the stack until it finally reflects and/or absorbs from either the skin or some object which is THz reflective like metal or opaque such as water. The sensor system records a time-domain waveform record of THz pulses reflecting from the concealment and objects within the concealment. The time-of-flight (TOF) of the reflection pulses within the recorded waveform are used to analyze the concealment and objects. At each transition of lower to higher index material, a reflection pulse will return to the receiver. At each transition of higher to lower index material, a reflection pulse of opposite sign will return to the receiver. The timing between the reflected pulses is a function of the distance between the layers, the thickness of the layers, and the index of refraction of the layers.

This method is known as time-domain reflection tomography. It can be thought as a non-contact electromagnetic analog to pulsed ultrasound tomography. Borrowing terminology from ultrasound tomography, the waveform record can be called an "A-Scan". A collection of A-Scans plotted as the sensor is moved laterally is a "B-Scan". A B-Scan image is the common sideways cross sectional ultrasound view used in medicine. A top down "x-ray" like image, or "C-Scan", can also be constructed by raster scanning the sensor over a grid.

The current anomaly detection algorithm analyzes the A-Scans, or waveforms, to on an individual basis to generate alarms. Ideally, the system will have a waveform record of 640 ps corresponding to a depth of 100 mm (determined by the TOF of the pulse through the object), which should cover most concealments worn by personnel. However other longer or shorter waveform records maybe used.

A preliminary list of anomalies which may be detected upon by the primary TD-THz signature detection method is shown in the table below. A presumed element of the screening concept of operations is that the passenger or subject should divest him or herself of all the perhaps ultimately benign but otherwise restricted objects in the table below prior to screening with an anomaly signature detection device (as is required in current checkpoint procedure).

| Example Anomalies Detected by TD-THz Signature Analysis |
|---|
| Bulk Explosives |
| Sheet explosives |
| C4 |
| Initiator |
| Battery |
| Ceramic Knife |
| Gun |
| Wallet |
| Solid metal |
| Perfume bottle |
| Lighter |

For the purposes of this section, a "General Anomaly" is any object that has an index of refraction that is greater by 1.45 than its surroundings ($\Delta n > 1.5$). Most solid materials, glass, ceramic, plastic, etc. fall into this category. In addition to these General Anomalies, it is expected that threat materials (such as explosives) would be a high priority for detection.

The instrument tests for a concealed anomaly one location at a time. The Probability of Detection (PD) and Probability of False Alarm (PFA) percentages assume that an anomaly (if present) is at the location targeted by the Anomaly Detector probe beam emitted by the hand-held instrument.

The table below is a list of typical concealments and interferents on a person. While an anomaly may be concealed, as under the headwear, there may also be items present which are not concealing the anomaly, and which themselves would not be classified as anomalies. These items we refer to as interferents. The list is not meant to be exclusive, but to give examples. In general, the anomaly signature detection devices is tested by calculating an average PD and PFA over a statistical sample of differing stacks of concealments and anomalies. Such a statistical sample should be representative of situations found in the general population.

| Description | Type | Anomaly Detected Within | Notes |
|---|---|---|---|
| Cloth, 1 layer | Concealment | yes | Cloth < 1 mm typ. |
| Cloth, 2-5 layers | Concealment | yes | Cloth < 1 mm typ. |
| Cloth, 6-10 layers | Concealment | yes | Cloth < 1 mm typ. |
| Cloth, 11-19 layers | Concealment | yes | Cloth < 1 mm typ. |
| Baseball Hat | Concealment | yes | |
| Hair or Wig | Concealment | yes | |
| Insulation (down) | Concealment | yes | |
| Bobby pin | Interferent | No effect | |
| Hair elastic | Interferent | No effect | |
| Slightly Damp* | Interferent | No effect | |

Figure 4:
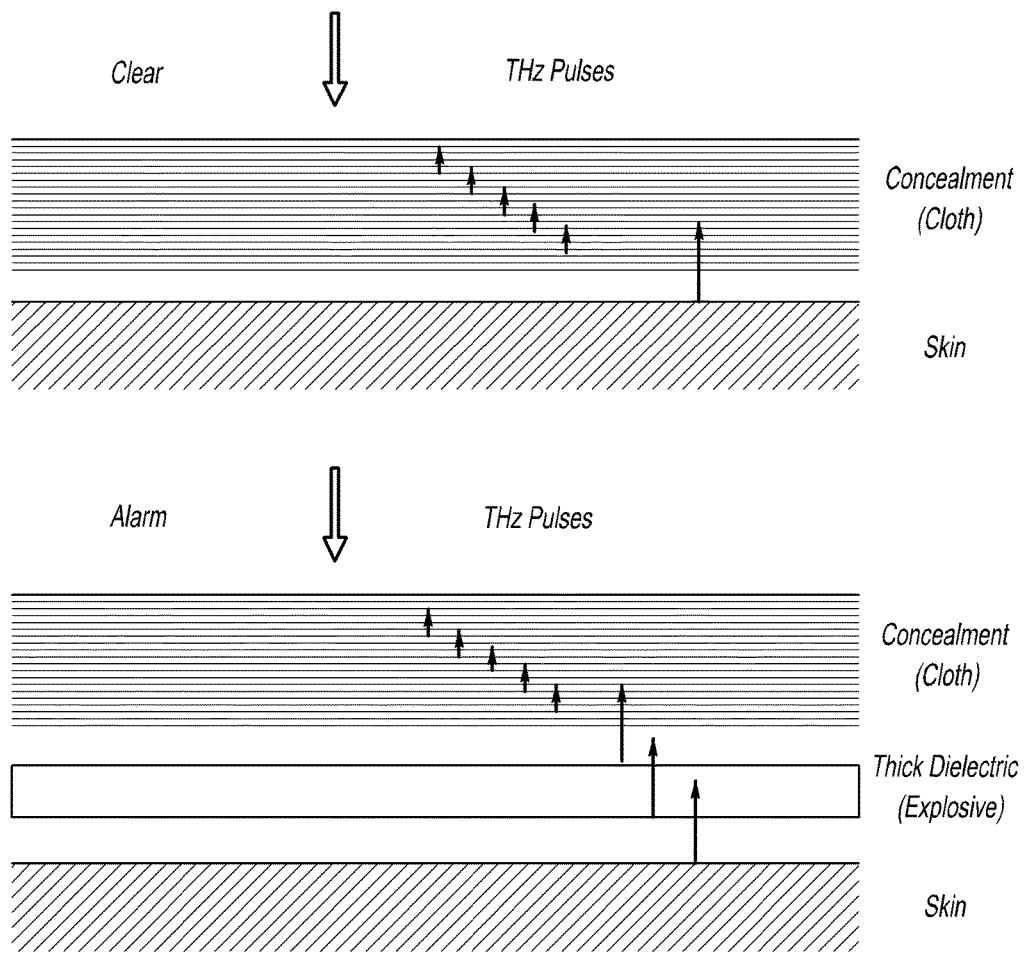
FIG. 4 illustrates an example cross-sectional diagram of a concealment stack.

An example cross-sectional diagram of a concealment stack without an anomaly (Top) and with an anomaly (Bottom) consistent with an explosive is shown in FIG. 4. The THz pulses are shown illuminating from the top and reflecting from the interior dielectric interface. A key feature of any inspected region is that the human body provides a backstop (last reflection). A return waveform without an identifiable backstop reflection above a minimum threshold will be indicative of a shield. For the purposes of TD-THz reflection tomography, anomalies and concealments can be grouped by several key physical properties which will differentiate and provide a signature for an alarm vs. clear condition.

Figure 5:
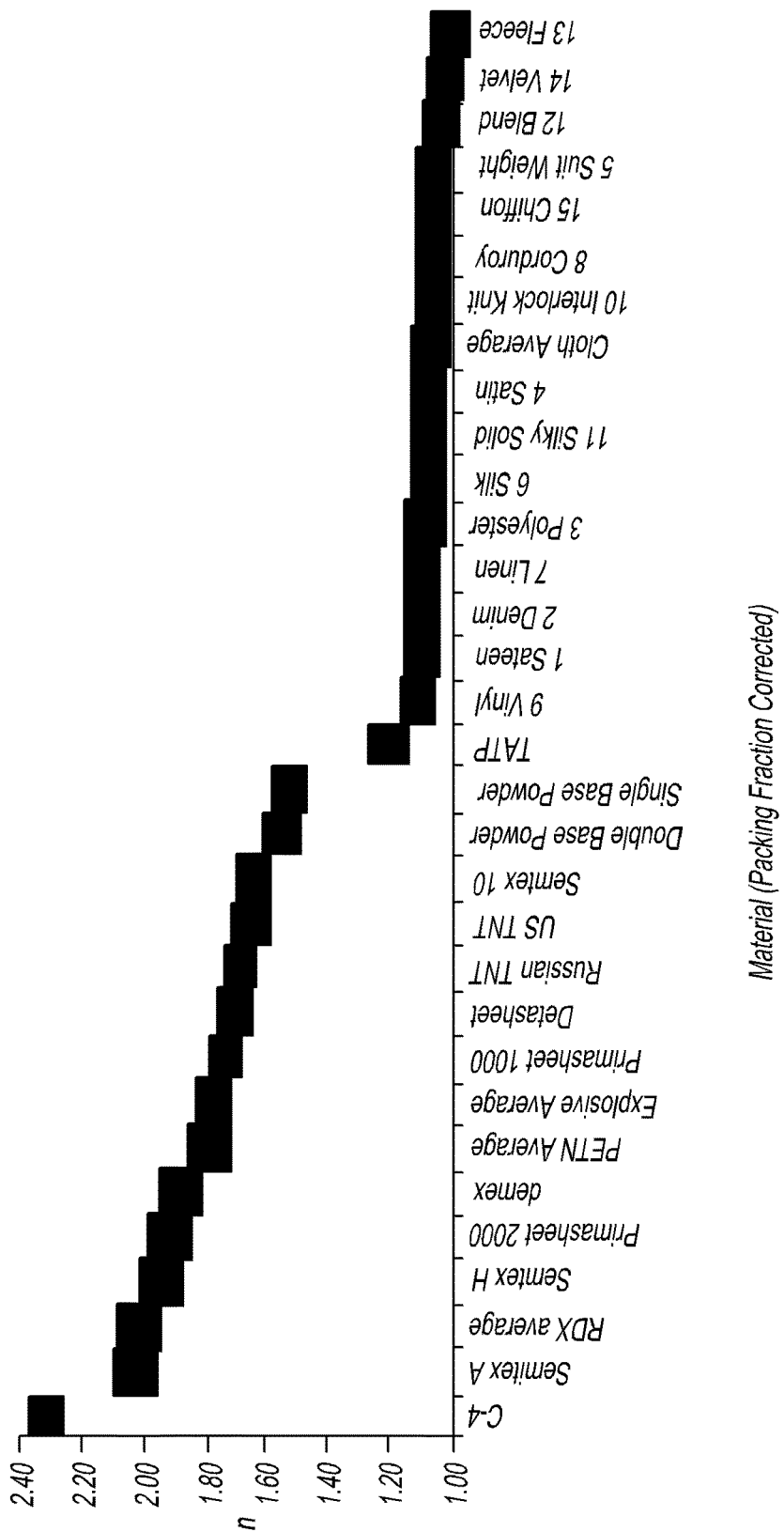
FIG. 5 illustrates effective THz indices of refraction for several explosives vs. typical concealment materials.

Anomalies are either dielectric materials such as explosives or metals. Dielectric anomalies are thick and solid, without incorporated air. For example, sheet explosives typically are have thicknesses of 1 mm, 3 mm, or 6 mm and have high THz indices of refraction, >>1.5. Concealments are either thinner, incorporate air, and/or have THz indices of refraction <1.5. FIG. 5 shows the effective THz indices of refraction for several explosives vs. typical concealment materials.

Thick dielectric anomalies are distinguished from the concealments by evaluating the timing and polarity of the sequence of reflection pulses. A thick dielectric will have both a positive going pulse reflected from the front surface (low to high index transition) and a negative going pulse from the rear surface (high to low index transition). The timing between these pulses is proportional to the thickness and index of refraction of material. A threshold timing can be set to alarm on thick dielectric anomalies (explosives, drugs). For example a 13 ps alarm threshold would correspond to layers >1 mm thick AND index >1.8. Concealment layers, e.g. cloth, have lower effective index and thickness and will exhibit pulse timings less than this threshold (if they have a negative going pulse at all). Cloth layers may not exhibit the negative going pulse because they may consist of fibers thinner than the THz wavelength. Metal anomalies will reflect much more strongly than the skin backstop. Metal can be alarmed upon by setting an amplitude threshold greater than that expected for skin.

Figure 6:
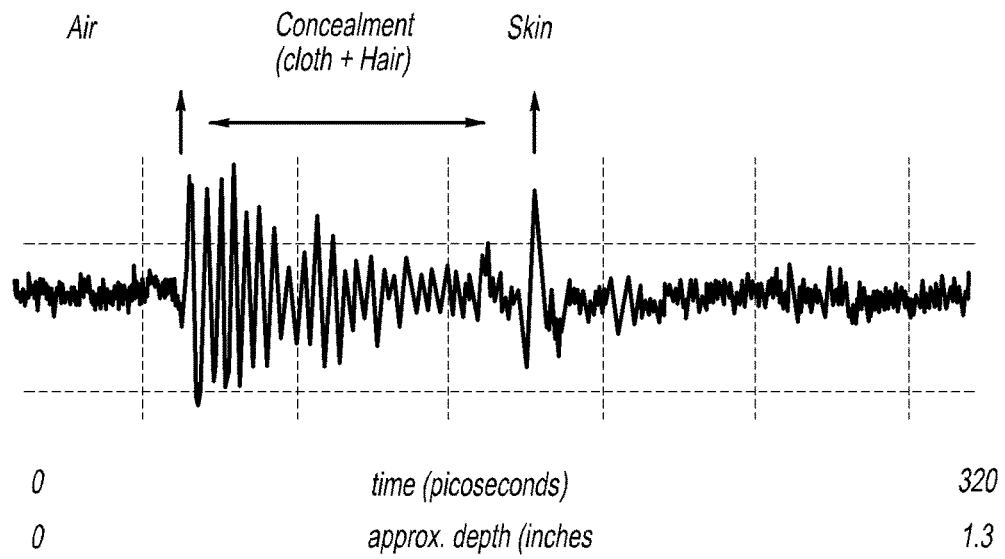
FIG. 6 illustrates an example waveform returned from a concealment stack without a thick dielectric anomaly consistent with an explosive.

An example of waveform returned from a concealment stack without a thick dielectric anomaly consistent with an explosive is shown in FIG. 6. This example waveform corresponds to the "Clear" stack structure in the top portion of FIG. 4. The waveform is interpreted from left to right. The first (positive going) pulse is the first surface reflection from several layers of cotton cloth. Several positive going pulses follow with spacing<<the thick dielectric threshold time for an alarm. In addition, no negative going pulses consistent with exiting a thick dielectric are in the waveform. The last pulse is a positive going pulse from the skin surface. This type of waveform can be interpreted as a "Clear" or "No Alarm".

Figure 7:
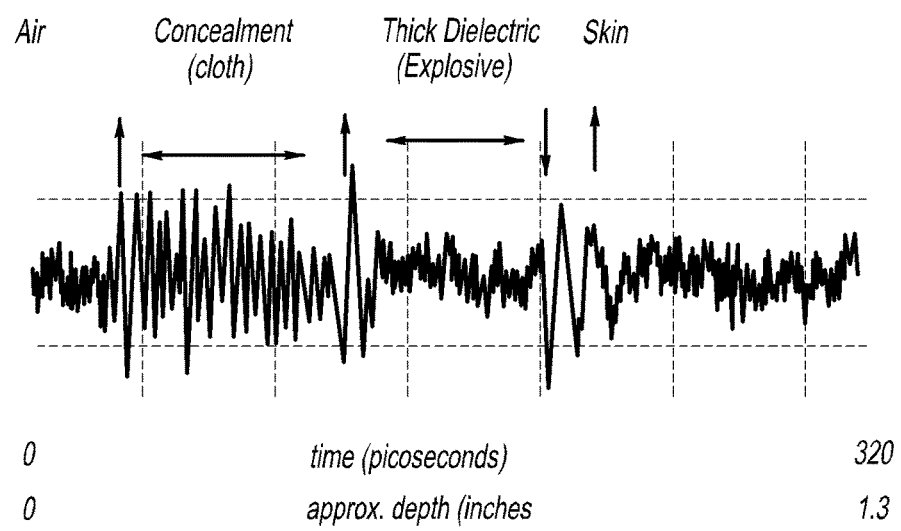
FIG. 7 illustrates an example waveform returned from a concealment stack with a thick dielectric anomaly consistent with an explosive.

An example of waveform returned from a concealment stack with a thick dielectric anomaly consistent with an explosive is shown in FIG. 7. This example waveform corresponds to the "Alarm" stack structure in the top portion of FIG. 4. The waveform is interpreted from left to right. The first (positive going) pulse is the first surface reflection from several layers of cotton cloth. Several positive going pulses follow with spacing<<the thick dielectric threshold time for an alarm. This is followed by a positive going pulse and then a negative going pulse separated by approx. 80 ps, which is much greater the thick dielectric threshold time for an alarm. The last pulse is a positive going pulse from the skin surface. This type of waveform can be interpreted as an "Alarm".

The system 10 will evaluate a waveform stream, and not each of these waveforms will be clearly positive or negative; in practice some will be better judged indeterminate. If the waveform is judged positive or negative the anomaly detector reports the detection decision to the operator immediately (latching positive or negative). When a waveform is indeterminate; the algorithm does not make a decision on the currently evaluated waveform, and then evaluates the next waveform in sequence. The examination time will have a fixed period before timing out. The evaluation of a waveform sequence by the detection algorithm could then end on an "indeterminate."

Indeterminate waveforms may include: 1) Waveforms where the sensor is not positioned too far away from location to be tested to capture any reflection; 2) Waveforms where no reflection pulse meets a minimum amplitude for evaluation; 3) Waveforms where no back stop reflection (the head) can be determined; 4) Waveforms which have insufficient time past the backstop to have confidence that all layers of the concealment are captured; 5) Waveforms which have insufficient time prior the first reflection to have confidence that all that all layers of the concealment are captured; 6) Waveforms which do not meet the thresholds for positive and simultaneously do not meet the threshold for negative; and 7) Other circumstances.

In practice, the third state "indeterminate" is only temporary, and will be resolved into a "binary" positive/alarm or negative/clear final result by either the instrument or the operator.

|  |  | Detection Algorithm Output Latch Positive Alarm | Three State Continuous Unlimited Retries Latch Negative Clear | Indeterminate |
|---|---|---|---|---|
| Actual Input | Positive | Correct Detection True Positive $P_D$ | Missed Detection (Incorrect No Detection) False Negative $1 - P_D$ | Evaluate Next Waveform Guide Operator Or at End Try Again |
|  | Negative | False Alarm (Incorrect Detection) False Positive $P_{FA}$ | Correct No Detection True Negative $1 - P_{FA}$ | Evaluate Next Waveform Guide Operator Or at End Try Again |

The table above assumes that the operator can always try again at the end of a sequence; and that at some point the operator will get a valid positive or negative during the examination. $P_D$ and $P_{FA}$ are calculated normally at the time of latch, as an examination never truly ends on "indeterminate".

If the waveforms the operator may be guided to reposition the sensor closer or farther away, or by an indicator tone indicating the amplitude of the reflected features.

Evaluating waveforms in sequence introduce problems of conditional probability. The thresholds could be tuned rather low, and latch positive or negative before the operator has maneuvered the hand-held into position to achieve the best reflection amplitude and positioning.

The detection algorithm could also look at the weighted average of a series of waveform thresholds before latching (in addition to or instead of latching on a single waveform). This may yield a better result. The truth table looks the same as above, the detection algorithm needs to have a "memory" or "history" of past results, which are then averaged and tested against a threshold as well.

Figure 8:
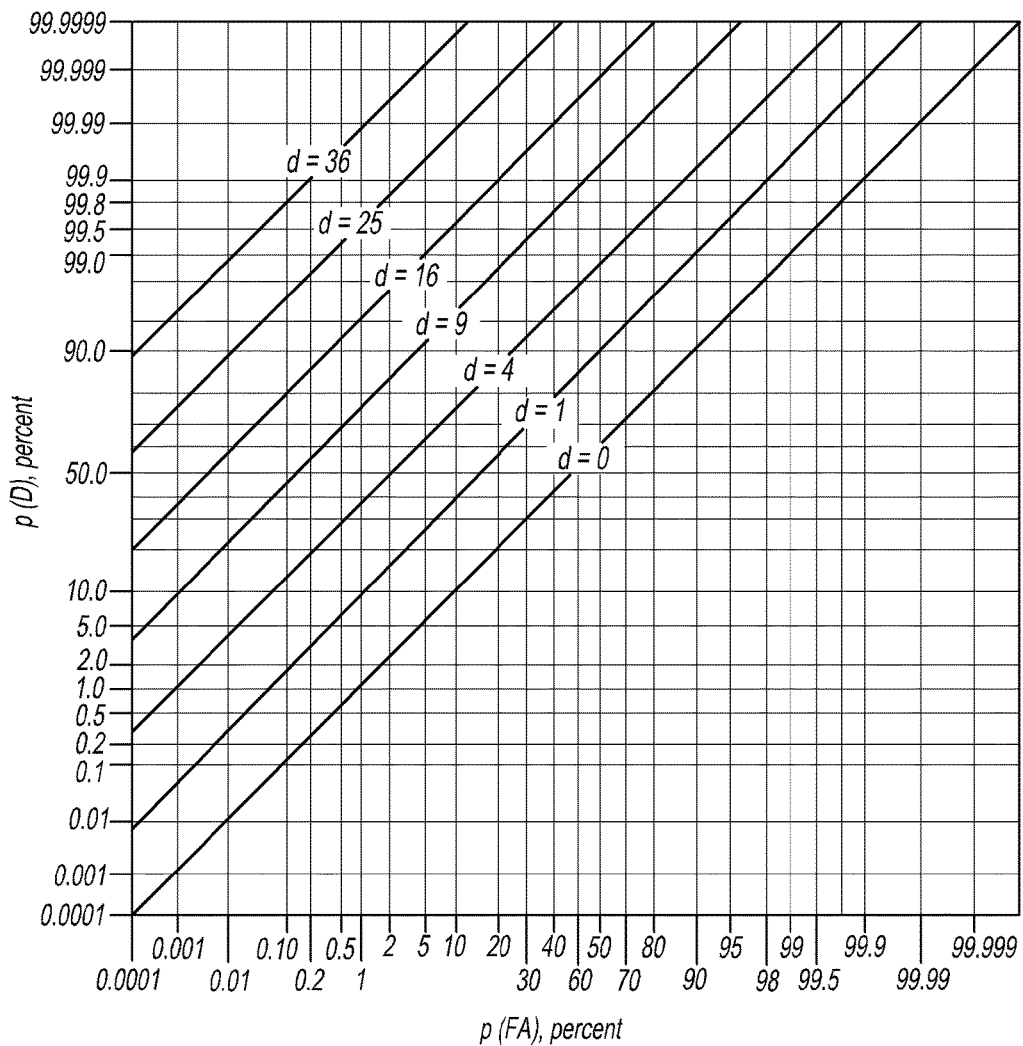
FIG. 8 illustrates a sample Receiver Operating Characteristic curve.

FIG. 8 illustrates a sample Receiver Operating Characteristic (ROC) curve is shown above. The ROC curve is a plot showing the trade-off in $P_D$ vs. $P_{FA}$ given a certain sample set, instrument, and detection algorithm. The example shown is for the simple thresholding of an RMS sonar signal with a Gaussian distribution of signal+noise and a Gaussian distribution of noise. Both the noise and signal vary from measurement to measurement, so the SNR is different from measurement to measurement. The detection index "d" is a measure of the overlap of these two Gaussian distributions. The center diagonal "d=0" is when the two distributions are equivalent (SNR=0 always). In this case, the threshold value determines the "chance" of detection (positive) or clear (negative) and $P_D = P_{FA}$. Examination of the ROC curve shows that in order for a detection system to be better than chance $P_D > P_{FA}$.

If the detection algorithm ends evaluating a waveform sequence on an "indeterminate" result, there are several choices. The choices may be made by the operator, or be made by the software.

Retry may not be allowed due to time constraints. In general, the CONOPS requires a definitive result. At this point, the operator or instrument must choose either to report positive/alarm or negative/clear, proceeding with a "binary" result.

Fail-safe=Indeterminate becomes positive/alarm on last result. Adds to the probability of detection and to the probability of false alarm.

Fail-deadly=Indeterminate becomes negative/clear on last result. Subtracts from the probability of detection and from the probability of false alarm.

Fail-chance=Indeterminate becomes positive/alarm on last result (50% chance). Subtracts from the probability of detection and adds to the probability of false alarm.

|  |  | Detection Algorithm Output Latch Positive Alarm | Three State Continuous Fail-safe Latch Negative Clear | Indeterminate |
|---|---|---|---|---|
| Actual Input | Positive | Correct Detection True Positive $P_D$ | Missed Detection (Incorrect No Detection) False Negative $1 - P_D$ | Evaluate Next Waveform Guide Operator Or at End True Positive $P_D$ |
|  | Negative | False Alarm (Incorrect Detection) False Positive $P_{FA}$ | Correct No Detection True Negative $1 - P_{FA}$ | Evaluate Next Waveform Guide Operator Or at End False Positive $P_{FA}$ |

|  |  | Detection Algorithm Output Latch Positive Alarm | Three State Continuous Fail-deadly Latch Negative Clear | Indeterminate |
|---|---|---|---|---|
| Actual Input | Positive | Correct Detection True Positive $P_D$ | Missed Detection (Incorrect No Detection) False Negative $1 - P_D$ | Evaluate Next Waveform Guide Operator Or at End False Negative $1 - P_D$ |
|  | Negative | False Alarm (Incorrect Detection) False Positive $P_{FA}$ | Correct No Detection True Negative $1 - P_{FA}$ | Evaluate Next Waveform Guide Operator Or at End True Negative $1 - P_{FA}$ |

|  |  | Detection Algorithm Output Latch Positive Alarm | Three State Continuous Fail-chance X % Positive to Y % Negative Latch Negative Clear | Indeterminate |
|---|---|---|---|---|
| Actual Input | Positive | Correct Detection True Positive $P_D$ | Missed Detection (Incorrect No Detection) False Negative $1 - P_D$ | Evaluate Next Waveform Guide Operator Or at End X % True Positive Y % False Negative |
|  | Negative | False Alarm (Incorrect Detection) False Positive $P_{FA}$ | Correct No Detection True Negative $1 - P_{FA}$ | Evaluate Next Waveform Guide Operator Or at End Y % True Negative X % False Positive |

The choice may be evaluated based on the resultant $P_D$ and $P_{FA}$ from the choice. A proposed rule of thumb is that the probability of concluding indeterminate result should be much less than the desired $P_{FA}$, or the use of fail-safe will bring $P_{FA}$ out of tolerance, or contrariwise the use of fail-deadly will bring $P_D$ out of tolerance. It is hypothesized that achieving the target $P_{FA}$ will be more difficult than achieving the desired $P_D$.

Choosing to fail-safe will increase $P_D$ at the expense of $P_{FA}$. If having chosen to always fail-safe, both $P_D$ and $P_{FA}$ meet the specified targets, then always fail-safe may seem the best choice. BUT note that a poor operator or non-compliant sample set could result in a *much* higher $P_{FA}$, in extreme cases, worse than chance, which might be interpreted as a peculiar result. Note that in any case, the probability concluding on an indeterminate result must not exceed the target $P_{FA}$.

Choosing to fail-deadly will decrease $P_{FA}$ at the expense of $P_D$. Choosing to fail-deadly also has peculiar consequences. Suppose $P_D$ exceeds the specified target but $P_{FA}$ does not meet the specified target; and the ratio of "indeterminate end results" to latched positive/negative decisions is not too large. Then consider the ratio of input positives to input negatives in the subset of tests from the sample that ended "indeterminate". If the ratio is small, then the algorithm could choose to always fail-deadly, and improve $P_{FA}$ without harming $P_D$ excessively. BUT once again note that poor operator or non-compliant sample set could result in a *much* lower $P_D$, in extreme cases, worse than chance, which would be a peculiar result Choosing to fail with a 50% 50% chance call on indeterminate results is the most statistically "neutral", and a poor operator or non-compliant sample set would result in a point near the 50% 50% on the "chance" "ROC" curve, which is what might be expected. Other ratios of chance could be chosen, all will bias the results near or onto "chance" curve in extreme circumstances (note that fail-safe and fail-deadly are technically on the chance curve as well).

Note that one is not precluded from presenting a "measurement failed/retry" result to operator, based on clear criteria that for some "indeterminate" results the hand-held examination was performed incorrectly, or that the sample was non-compliant. The operator then must decide how to classify the result (a sequence with high quality waveform(s) which meet neither the threshold for positive nor the threshold for negative would still be failed "chance or failed deadly"). Ideally, all "measurement failed/retry" results would be excluded from valid tests, and not add or subtract from $P_D$ and $P_{FA}$. This is the case if the operator has enough time to retry the test. The requirement that a decision be made whether to proceed to secondary screening may motivate a customer "fail-safe" criteria. Customer testing should properly credit $P_D$ in this case, and be aware that $P_{FA}$ may be greater that 50% for very poor operators.

The TD-THz data from a single point and a single transceiver are to be interpreted in this current scheme. This limitation should not preclude the extension of the scheme to multiple sensors, moving sensors, multiple regions, sensor fusion, and/or other logical improvements to the detector.

A unique region on the subject representing nominally only one static structure interacting with the TD-THz beam regardless of hand-held variance. This single static structure may or may not contain an anomaly. If the region does not contain an anomaly it is "clear". The method should be tolerant to slight change of the region of interaction as the sensor is moved slightly laterally.

The changes in reflected TD-THz waveform timing, amplitude and shape due to the sensor being moved in angle and distance relative to the intended single point region under test. A challenge in the algorithm development is to achieve an adequately high probability of alarm while maintaining an adequately low probability of false alarm when interpreting a measurement sequence subject to hand-held variance.

The circumstance where the angle and position of the hand-held sensor minimizes the hand-held variance. The ideal measurement condition represents the optimum configuration with the best chance to collect a waveform (or group of waveforms) which contains either an unambiguous anomaly signature or an unambiguous clear signature. Substantial effort has been given to develop a framework for an automatic interpretation algorithm which delivers the best results when the single-point region under test will not yield an unambiguous signature even under the ideal measurement condition; and/or when the hand-held variance is severe.

The hand-held sensor will collect a sequence of TD-THz waveforms from the single-point region under test for a limited period of time. The automatic interpretation algorithm must generate and report a final alarm state from this finite sequence of TD-THz waveforms. The period of measurement starts when triggered by the operator and stops when either switched off by the operator or when it times-out. The exact duration to be specified, but is to be expected to be rather short (less than 20 s). The process in by which the operator moves the sensor through a range of angle and distances during the finite period of measurement which (hopefully) contain the ideal measurement condition. This algorithm framework is designed to accommodate the operator being guided by feedback which instructs him or her to move the sensor closer or further form the subject, or to change the angle as an addition to the basic algorithm. But more immediately, the framework is designed so the operator can get immediate feedback should the unambiguous signature be evaluated and the alarm state latch to "alarm-anomaly" or "clear" during the finite period of measurement.

Negligible Latency of Evaluation:

As each TD-THz waveform is evaluated in the sequence, as soon as it is possible to recognize the unambiguous alarm or clear signature, the alarm state should latch to "alarm-anomaly" or "clear" with negligible latency (ideally no more than "one-behind"). This allows the operator to develop a hand-held optimization movement and allows the operator to correlate the ideal distance and orientation with respect to the subject and the sensor that will yield and unambiguous answer (rather than timing out to an "alarm-time out state", which ultimately increases the probability of false alarm). This also lays the ground work to easily extend the algorithm to allow the sensor to be "driven around" over the multiple regions under test.

TD-THz Waveform Sequence:

A time ordered series of TD-THz waveforms collected during the finite period of measurement. The TD-THz instrument collects the waveform sequence using a free-running scanning optical delay line with waveform repetition rate of 100 Hz (expected) or 1 KHz. The alarm state(s) are to be interpreted either immediately from a single waveform within the sequence and/or cumulatively or collectively from a group of waveforms.

TD-THz Waveform:

A single TD-THz point of data consisting of a set of ordered pairs measuring electric field vs. time reflected from the single-point region under test. Typical waveform window durations are 80, 320 and 640 ps representing approximately 0.5, 2 and 4 inches of reflected structure (depending on index). The waveform will consist of a series of bipolar pulses, each due to a reflection from a surface and/or interface on or within the single point region of interest. The timing of the reflection pulses is proportional to the displacement in depth of the interface as the THz beam travels into the single-point region under test.

Anomaly Condition:

The circumstance where an anomaly is physically present in the single point region under test. It is desirable that an anomaly condition correspond to an anomaly signature Clear Condition:

The circumstance where no anomaly is physically present in the single point region under test.

Signature:

The features representing either an anomaly or clear condition on either an immediate single waveform or cumulatively in a group of waveforms. In the current scheme, the signature is recognized by the comparison of the "feature decision parameter matrix" to the "signature threshold table".

Anomaly Signature:

The circumstance where the signature for an anomaly condition is unambiguously present in the TD-THz waveform sequence. The automatic interpretation algorithm process should latch the (final) alarm state to "alarm-anomaly". If in any finite period of measurement the anomaly signature is actually corresponds to an anomaly condition, a true detection should result and increase the probability of detection. Contrariwise, if the clear condition is present, then a false alarm increases the probability of false alarm.

Conditional Anomaly Signature:

The circumstance where the signature for an anomaly condition meets a lower threshold value which does not cause an immediate latch to the "alarm-anomaly" final alarm state and stop the measurement process. A conditional state anticipates the circumstance where the "quality" of the waveforms is poor, that is the operator would seem to be far from the ideal measurement condition, and an improvement in the "quality" of the waveforms may be expected.

Clear Signature:

The circumstance where the signature for a clear condition is unambiguously present in the TD-THz waveform sequence. The automatic interpretation algorithm process should latch the (final) alarm state to "clear". If in any finite period of measurement the clear signature is actually corresponds to clear condition, a true clear should result and decrease the probability of false alarm. Contrariwise, if the anomaly condition is present, then a false negative results and increases the probability of false negative.

Conditional Clear Signature:

The circumstance where the signature for an anomaly condition meets a lower threshold value which does not cause an immediate latch to the "alarm-anomaly" final alarm state and stop the measurement process. A conditional state anticipates the circumstance where the "quality" of the waveforms is poor, that is the operator would seem to be far from the ideal measurement condition, and an improvement in the "quality" of the waveforms may be expected.

Shield Condition:

The circumstance where the single point region under test is physically prevents an unambiguous anomaly or clear signature in the reflected THz waveform even under the ideal measurement conditions. The shield condition is additional circumstance which may or may not be present, however every single point under test must be classified as either an anomaly condition or a clear condition regardless.

Indeterminate Signature:

Defined as the absence of an anomaly signature or a clear signature (even under the ideal measurement condition). Many waveforms or groups of waveforms from the waveform sequence collected in any finite measurement period may not be judged to have either an unambiguous anomaly signature or an unambiguous anomaly signature. This is because the hand held measurement process is dynamic, reliant on operator skill, hand-held variance may be present, and shield conditions may prevent an unambiguous signature from being evaluated even under the idea measurement condition.

Partial List of Potential Single Sensor TD-THz Signature Issues Addressed by Multi-Sensor Approach

| TD-THz Detection Issue | Multisensory solution | Specific technique |
|---|---|---|
| Intervening heavy absorption of concealment makes single TD-THz waveform signature of metal threat similar to skin. | Sensor spatial tracking to detect transition from metal backed to skin backed region. Direct detection of metal with inexpensive sensor. | 1. 3D sensor position tracking. 2. Multiple side-by side beams. 3. Inductance detector 4. Dielectric spectroscopy |
| Dielectric anomaly (explosive) has very poor reflection (e.g. very rough or scattering) | Independent sensing of block of high refractive index dielectric would allow THz threshold to be set lower. | 4. Dielectric spectroscopy |
| Intervening heavy absorption of concealment make TD-THz water bag or bottle signature similar to skin. | Detection of water. | 4. Dielectric spectroscopy |

Shield Condition:

The circumstance A single point, non-imaging mode TD-THz reflection sensor is able to detect explosives hidden on a person's body behind clothing. However, as with other checkpoint methods, the range of possible concealment, shield, and/or anomaly configurations (intentional or otherwise) occurring in a broad population sample may require the threshold for the TD-THz detection algorithm be tuned to handle distorted or ambiguous signatures, which would increase the PFA (to keep PD constant). We describe to examine some multi-sensory methods which would provide additional information which would help clarify ambiguous measurements. The matrix above considers some of the specific concealment/anomaly/shield situations which might result in distorted or ambiguous TD-THz waveforms, and the methods that can counter these. Note that in most cases the intentional attempt to conceal an explosive or weapon from TD-THz interrogation (using metal or water shields) will in and of itself create a valid anomaly triggering an alarm (the sensor should alarm on such shield conditions regardless).

All of these techniques are well known for non-destructive evaluation (NDE), although not necessarily for security applications. In general, these techniques would have varying suitability and possible poor performance when used as the sole threat sensing methods. However, what is described is a method to team these techniques with the specificity of TD-THz will give additional detailed information about the vicinity of the sensor.

When the terahertz results are ambiguous, these inexpensive sensors will be used to double-check the consistency of the results. In this way the capabilities of a multisensory wand will lead to better POD at minimal cost increment. The Additional Sensors which Will be Evaluated in Combination with the Primary TD-THz Sensor

| | | |
|---|---|---|
| 1. | A 3D acceleration sensor to allow the lateral correlation of TD-THz reflection waveforms. | This will allow the determination of the spatial extent of an anomaly (allowing anomalies with volumes too small to be ignored); and to detect the transition from benign to shield/anomaly regions. |
| 2. | A spatial multiplexing lens/and or multiple side-by-side TD-THz detectors. | This will allow the differential comparison of two or more regions simultaneously, allowing the differential detection of the transition from benign to shield/anomaly regions. |
| 3. | An inductance detector circuit (traditional metal detector) circuit tuned to examine the same region as the TD-THz beam. | While the TD-THz beam will have the ability to discriminate the high reflectivity of metal from skin and other dielectrics, a metal detector circuit would detect certain metal configurations a THz beam may miss, such as: metal behind other THz shield conditions; fine mesh or wires; and/or metal with a very diffusively scattering surface. |
| 4. | A capacitance or microwave measurement circuit to provide additional dielectric information about the region under test at sub-THz frequencies. | This data can be statistically combined with the TD-THz signatures to further refine automatic discrimination of anomalies. |

Shield Condition:

The outputs of sensors 1 through 4 above may be combined with the primary TD-THz automated anomaly detection algorithm. One or more may be used with the TD-THz sensor baseline. These sensors will allow the automated algorithm to be modified to improve the PD and PFA in comparison to the primary TD-THz sensor alone in a wider variety of personnel screening conditions. In generally, it is desirable to have the best probability of detection given a tolerable probability of false alarm (plotting PD vs. PFA as the threshold of an algorithm is tuned is known as the receiver operating characteristic or ROC). More sensors inputs will generally allow the ROC of the device to be tuned to achieve a better PD for the same PFA. Likewise, a ROC will generally worsen as the distribution of potential alarms (anomalies) increases and the benign background becomes more varied, which may occur as the concept of operation of the Anomaly Detector is expanded beyond examining headgear to all regions of the body and/or populations which do not wear headgear—multiple sensors can improve the ROC in this situation.

For detection problems where a threat is screened behind an anomaly which is opaque to electric fields, one technique is to look for the edges of the screen. This can be done carefully by a practiced operator who is carefully monitoring the TD-THz trace while slowly moving the handheld scanner. But some sort of position detecting device on the handheld scanner would aid this process, because it would allow the hand motions to build up a small map of the area being scanned. MEMS accelerometers and gyroscopes may be used to measure the position of the handheld scanner to build this small map.

While the present invention has been described with reference to specific exemplary embodiments, it will be evident that various modifications and changes may be made to these embodiments without departing from the broader scope of the invention as set forth in the claims. Accordingly, the specification and drawings are to be regarded in an illustrative rather than a restrictive sense.

The invention claimed is:

1. A system for detecting anomalies concealed upon a person, the system comprising:
    a detection probe having an electromagnetic transmitter and an electromagnetic receiver, the electromagnetic transmitter is configured to emit electromagnetic pulses, the electromagnetic receiver is configured to sample electromagnetic pulses from the electromagnetic receiver at specified times within a waveform window;
    an objective optic incorporated in the detection probe, the objective optic configured to direct the pulsed electromagnetic radiation emitted by the transmitter to a concealment stack and;
    the objective optic being configured to receive and direct to the receiver reflections of the concealment stack at a defined distance, wherein the detection probe may be focused at a depth of concealed skin of the person without the exterior of the detection probe contacting a top of the concealment stack;
    the transmitter and receiver configured in a monostatic reflection geometry with respect to an objective optic; and
    a time domain data acquisition system in communication with the receiver, the time domain data acquisition system configured to capture reflections from a range thickness of the concealment stack and generate a returned waveform, the waveform window having the reflection time corresponding to the focus of the objective optic
    wherein the time domain data acquisition system is configured to determine by analyzing the returned waveform that the one or more intereferent components of the concealment stack is smaller in either volume, density, or mass than a quantitative threshold to be considered an anomaly;
    wherein the quantitative threshold is based on thickness, lateral extent, volume, density, or mass to be considered an anomaly;
    an indicator indicating when an operator of the detection probe is at an appropriate distance from the concealment stack to obtain a valid measurement, wherein the appropriate distance is 100 mm or less.

2. The system of claim 1, where the concealment stack over the skin of the person further comprises clothing or coverings, wherein time domain data acquisition system determines the concealment stack to not contain an anomaly or a shield.

3. The system of claim 2, wherein the clothing or coverings further comprise natural or synthetic cloth, leather, rubber, vinyl, paper, plastic and/or other fibers, sheets or weaves.

4. The system of claim 1, wherein the concealment stack further comprises one or more intereferent components located at any position within the concealment stack and composed of material of the same type as an anomaly or shield, wherein the time domain data acquisition system is configured to determine that the intereferent is smaller in either volume, density, or mass than a threshold value to be considered an anomaly.

5. The system of claim 4, wherein the concealment stack further comprises one or more anomaly placed at any level within the concealment stack, where the anomaly is an object of greater thickness, lateral extent, volume, density, or mass than a threshold value.

6. The system of claim 1, wherein the time domain data acquisition system is configured to choose a quantitative threshold for thickness, lateral extent; volume, density, or mass to be considered an anomaly by scaling thresholds to electromagnetic properties of the anomaly material in comparison to a benign material in the concealment stack and evaluating the measurement from the system as an anomaly when the waveform contains one or more features indicating that an object within the concealment stack exceeds the scaled thresholds.

7. The system of claim 1, where the electromagnetic pulses span the terahertz spectral region of 0.04 to 4 THz.

8. The system of claim 1, further comprising a light source that projects an illuminated pattern onto the concealment stack on the person under test indicating a region of inspection.

9. The system of claim 1, further comprising optical fibers connected to the electromagnetic transmitter and electromagnetic receiver, wherein femtosecond laser pulses are directed from a source to the electromagnetic transmitter and the electromagnetic receiver by the optical fibers.

10. The system of claim 9, further comprising a compensator located between the source and the electromagnetic transmitter or electromagnetic receiver, wherein the compensator compensates the pulses so that the pulses are sufficiently short at the electromagnetic transmitter or electromagnetic receiver.

11. The system of claim 10, wherein the compensator is a grating sequence, a prism sequence, a grism sequence, a fiber bragg grating, or anomalous dispersion fiber.

12. The system of claim 1, further comprising a sensor connected to the detection probe, wherein the sensor is configured to provided coordinates of the detection probe's position in one or more dimensions of space or angle.

13. The system of claim 1, further comprising a sensor connected to the detection probe, wherein the sensor is configured to detect in a different modality than the waveforms reflected from the concealment stack and interrogate a substantially same region of concealment stack on the person.

14. The system of claim 1, further comprising a secondary transmitter connected to the detection, wherein the secondary transmitter if configured to emit alpha, beta, x-ray, or gamma rays.

15. A method using a dynamically positioned detection probe for evaluating a time domain reflected waveform for criteria corresponding to features which indicate an anomaly in a region of a concealment stack on a person, the method comprising the steps of:
 indicator indicating when an operator of the detection probe is at an appropriate distance from the concealment stack to obtain a valid measurement, wherein the appropriate distance is 100 mm or less;
 illuminating a concealment stack with an electromagnetic pulse emitted by a transmitter and directed from the transmitter to the concealment stack by an objective optic, wherein the transmitter and objective optic are located within the detection probe;
 directing reflections of the concealment stack to a receiver by the objective optic, the receiver being located within the dynamically positioned probed;
 collecting the waveform by the receiver in the probe;
 parsing the waveform into a candidate group of positive or negative going peaks corresponding to reflection interfaces within the concealment stack;
 determining if an anomaly is present if one or more peaks within the candidate group quantitatively correspond to one or more thresholds computed from the amplitudes and/or one or more differences in time between one or more peaks in the candidate group
 determining by analyzing the waveform that the one or more intereferent components of the concealment stack is smaller in either volume, density, or mass than a quantitative threshold to be considered an anomaly; and
 wherein the quantitative threshold is based on thickness, lateral extent, volume, density, or mass to be considered an anomaly.

16. The method of claim 15, further comprising the step of deconvolving the waveform with a pre-recorded reference reflection waveform.

17. The method of claim 16, wherein the pre-recorded reference reflection waveform is a single reflection from an air-metal interface.

18. The method of claim 15, further comprising the step of scaling the amplitude of the peaks as a function of a relative increase of the peaks in time with respect to a first peak in the waveform for compensating for a loss from intervening concealment as the thickness of the concealment stack increases.

19. The method of claim 15, further comprising the step of scaling the amplitude of the peaks as a function of a relative number after a first peak in the waveform for compensating for a loss from intervening concealment as the thickness of the concealment stack increases.

20. The method of claim 15, further comprising the step of not evaluating a waveform if any peak in the waveform falls outside a window of minimum or maximum time for reducing a false alarm rate.

21. The method of claim 15, further comprising the steps of:
 ordering the peaks in the candidate group from lesser to greater time; and
 determining if a difference in time between a first and a second peak exceeds a minimum threshold.

22. The method of claim 15, further comprising the step of determining the presence of an anomaly if a positive going peak in the candidate group exceeds a threshold corresponding to a maximum expected reflection amplitude from a benign concealment, wherein additional peaks must be present after the positive going peak.

* * * * *